Figure 2C:
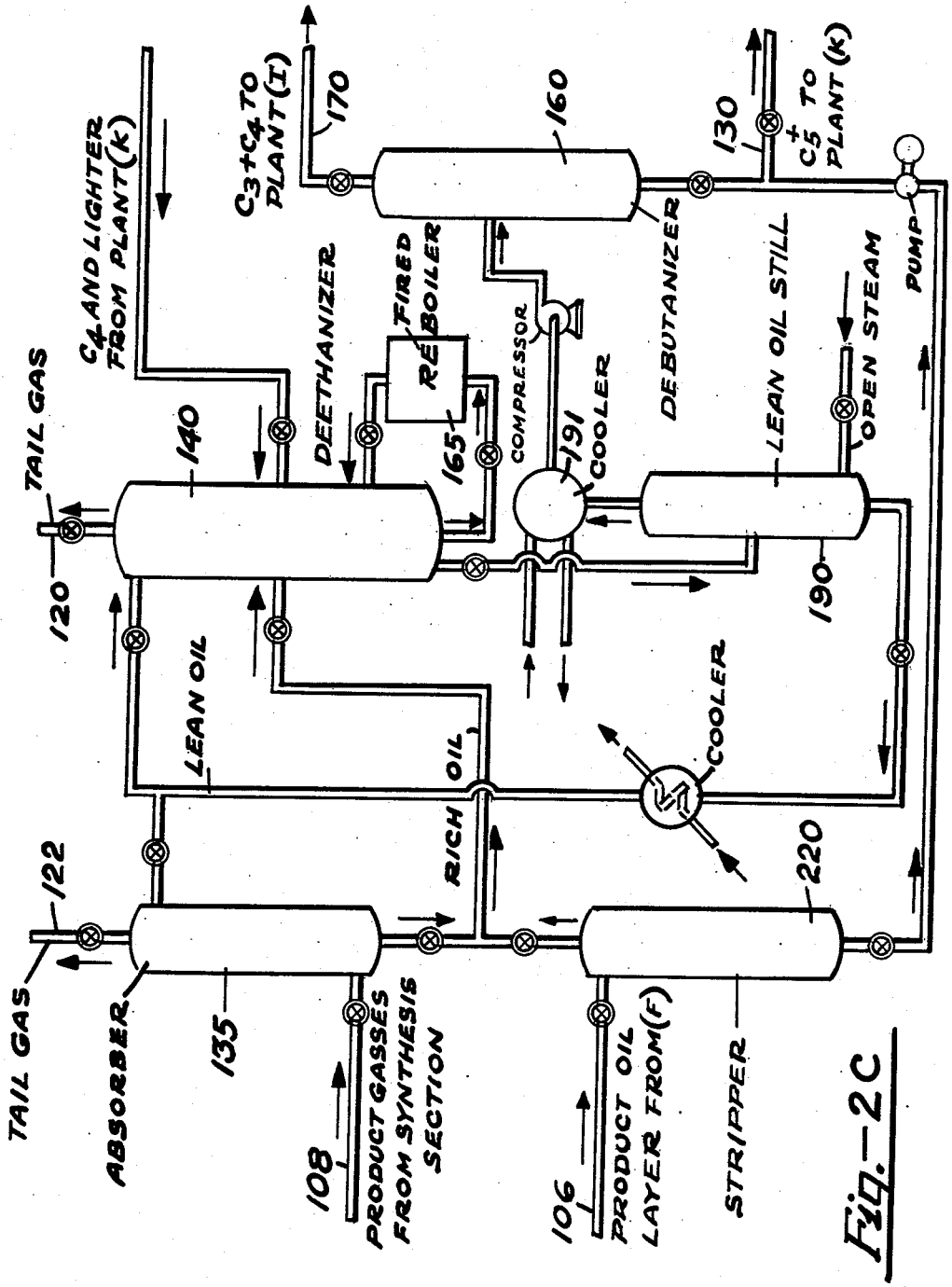

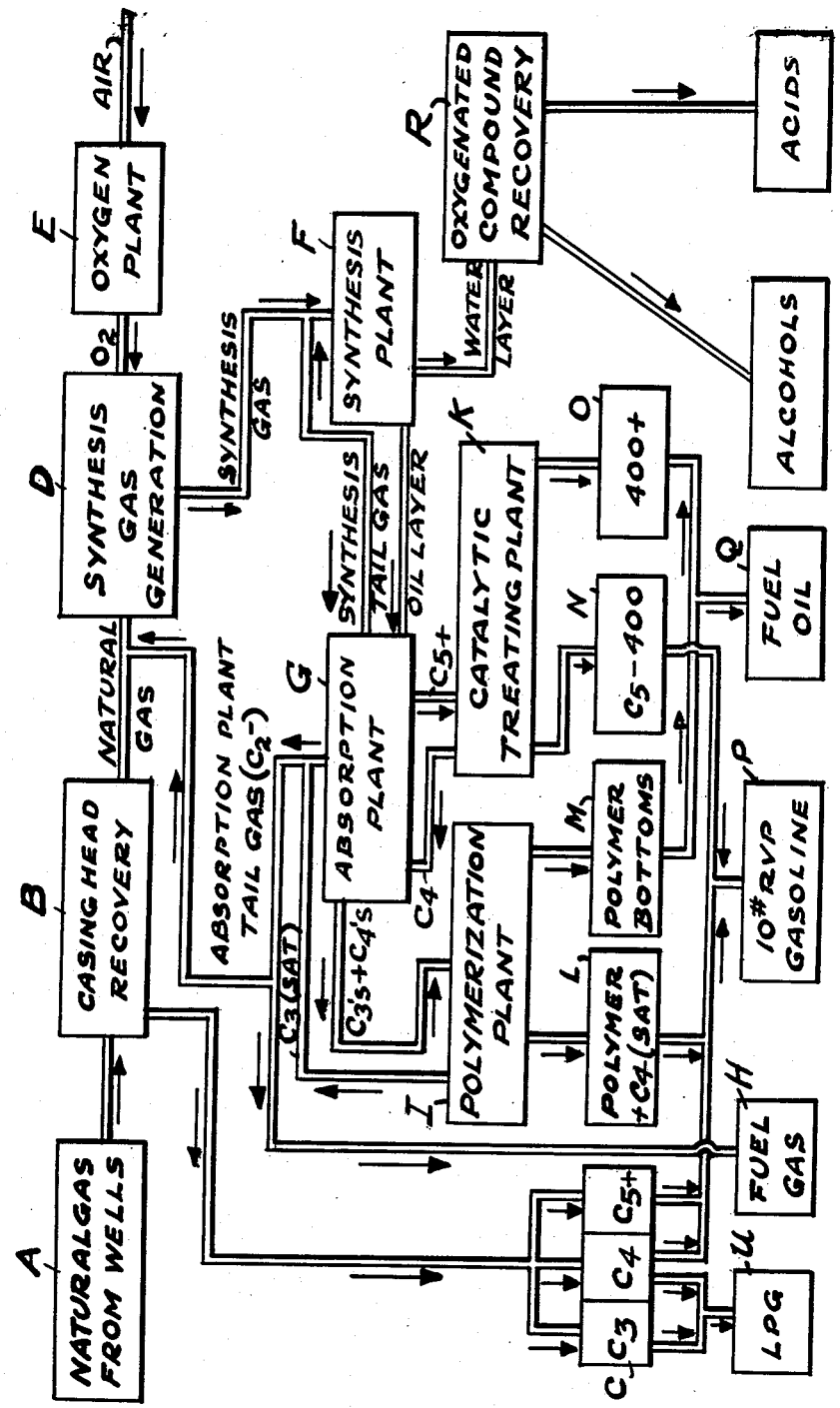

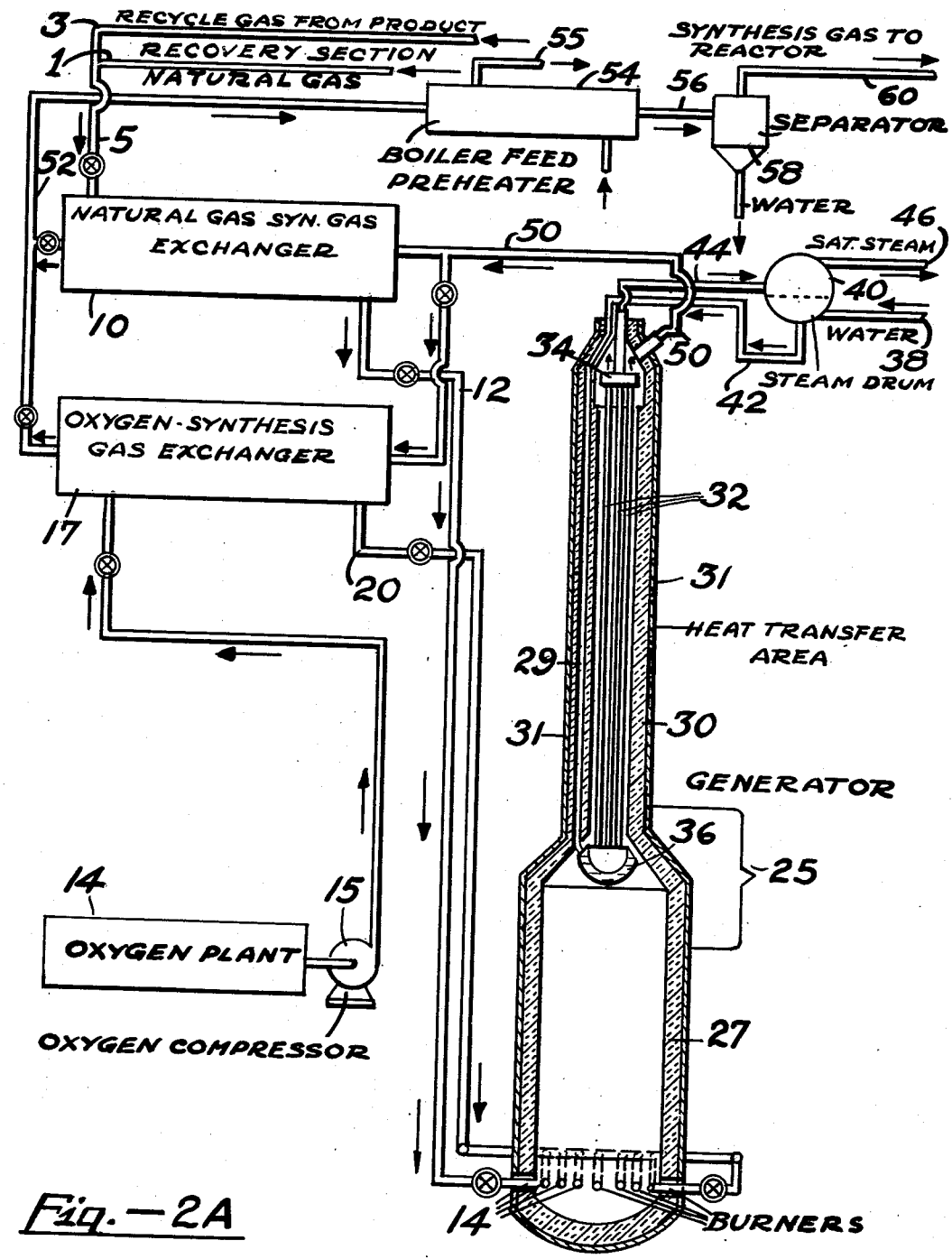
Fig.—2A

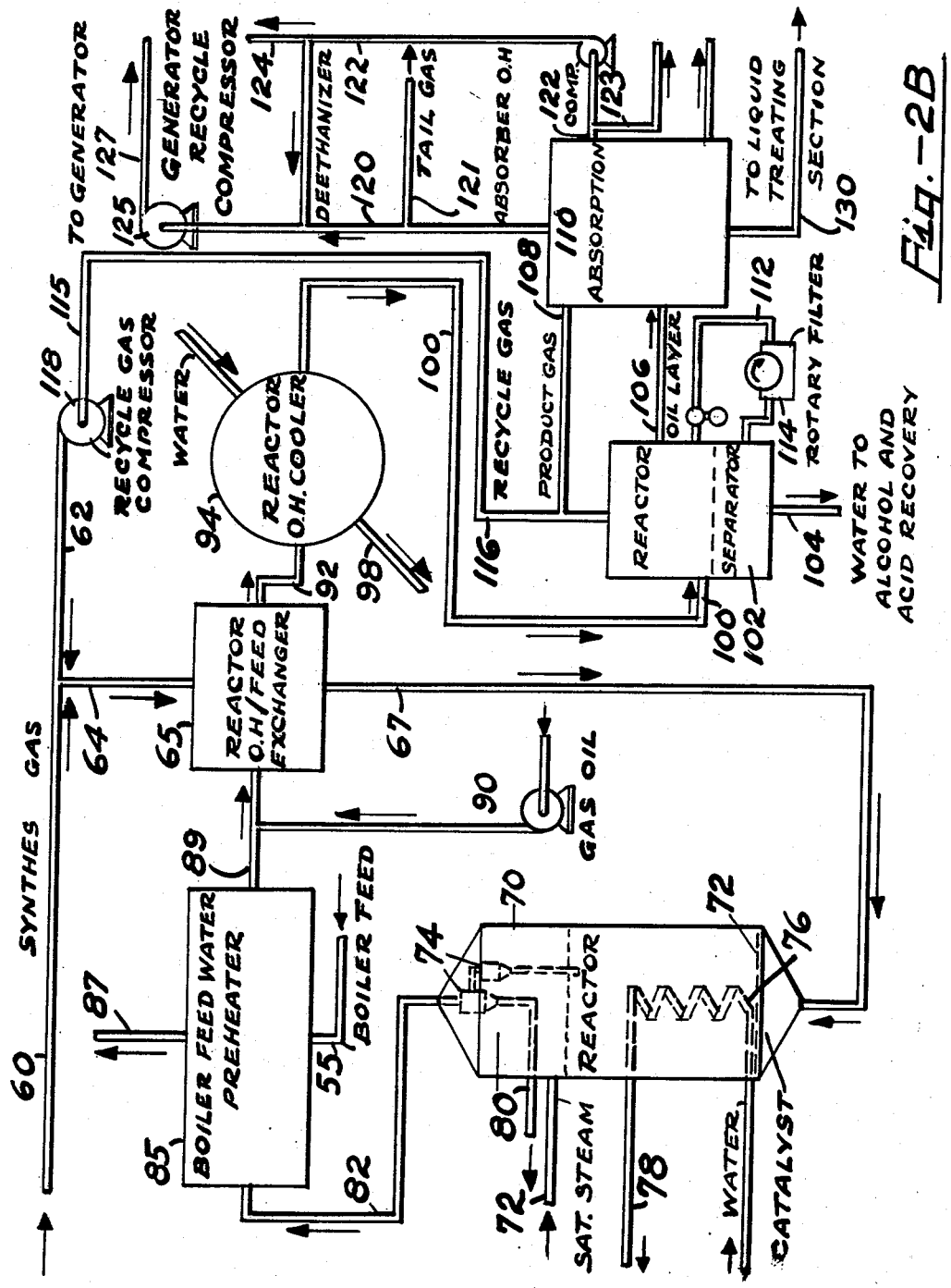

Patented July 6, 1954

2,683,158

UNITED STATES PATENT OFFICE 2,683,158

HYDROCARBON SYNTHESIS PROCESS

James W. Brown, Summit, and Harvey E. W. Burnside, Rumson, N. J., assignors to Standard Oil Development Company, a corporation of Delaware Application May 21, 1949, Serial No. 94,632

4 Claims. (Cl. 260—449.6)

The present invention relates to the manufacture of valuable synthetic products by the catalytic conversion of gas mixtures containing hydrogen and carbon monoxide produced from gaseous hydrocarbons such as natural gas, refinery gases, etc. The invention is more particularly concerned with improvements in synthesis gas production, hydrocarbon synthesis operation and synthetic product recovery, which cooperate to afford increases in yields of desired products and in thermal efficiency resulting in substantial savings in the synthesis of motor fuels and other valuable products on the basis of natural gas or the like.

The catalytic synthesis of hydrocarbon oils and valuable chemicals from carbon monoxide and hydrogen has been assuming increasing importance in recent years as a source of fuels and raw materials supplementing crude oil resources. The process is generally based either on natural gas and other gaseous hydrocarbons or on coal and other carbonaceous solids as the raw material for the production of synthesis gas containing CO and $H_2$ in the desired proportions. At the present time neither process type has advanced to a state of development at which the products of the synthesis could be manufactured at a cost fully competitive with that of similar products recoverable from crude oil.

This is particularly true for the synthesis of high octane motor fuels in the form of substantially unsaturated hydrocarbons which may be produced from carbon monoxide and hydrogen in the presence of iron catalysts at elevated pressures. Extensive research and development work within the last ten years has demonstrated that the most desirable procedure with respect to thermal efficiency as well as product yields and quality involves application of the so-called fluid solids technique wherein the catalyst is maintained in the form of a dense highly turbulent mass of finely divided solids fluidized by upwardly flowing gases to resemble a boiling liquid having a well defined upper interface. This technique, particularly when applied to iron-type catalysts, normally involves the use of relatively high pressures above about 250 lbs. and preferably of about 400–600 lbs. per sq. in. to prevent catalyst carbonization and fluidization difficulties.

One of the obstacles in the path of using hydrocarbon gases as the basis for this type of synthesis operation has been the high cost of the production of high pressure synthesis gas. Other difficulties arose in connection with heat economy and product recovery, with the result that a product competitive with that obtained from natural petroleum could be produced only under the most favorable conditions of raw material, equipment and labor cost.

It is, therefore, the principal object of the present invention to provide an improved process for the catalytic production of valuable synthetic products from CO and $H_2$.

A more specific object of the invention is to provide an improved process for the catalytic synthesis of normally liquid hydrocarbons and other valuable products from CO and $H_2$ produced from gaseous hydrocarbons such as natural gas, refinery gas, coal distillation gas, etc.

Other and more specific objects and advantages will appear hereinafter.

Figure 3:
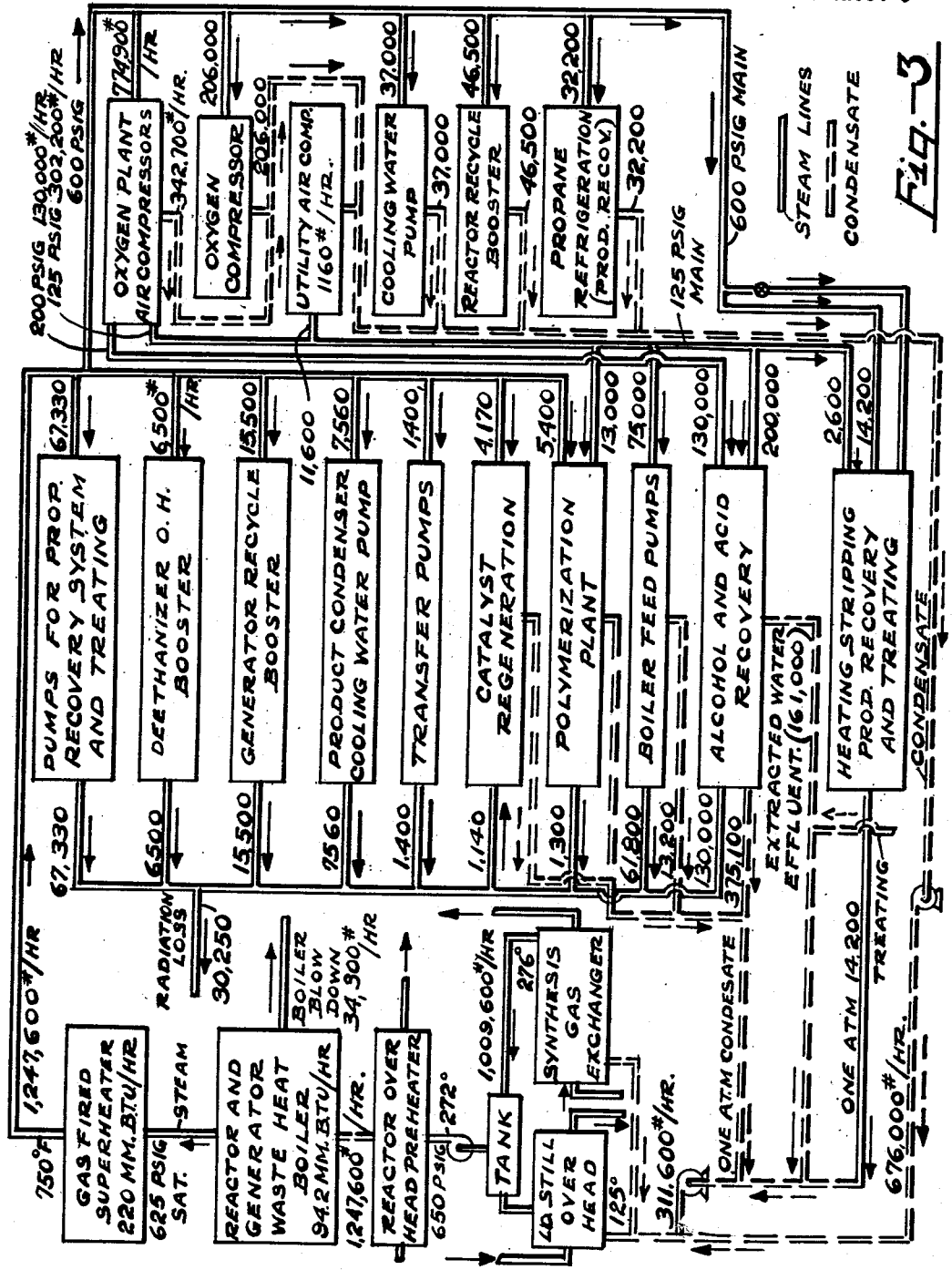
Figure 4:
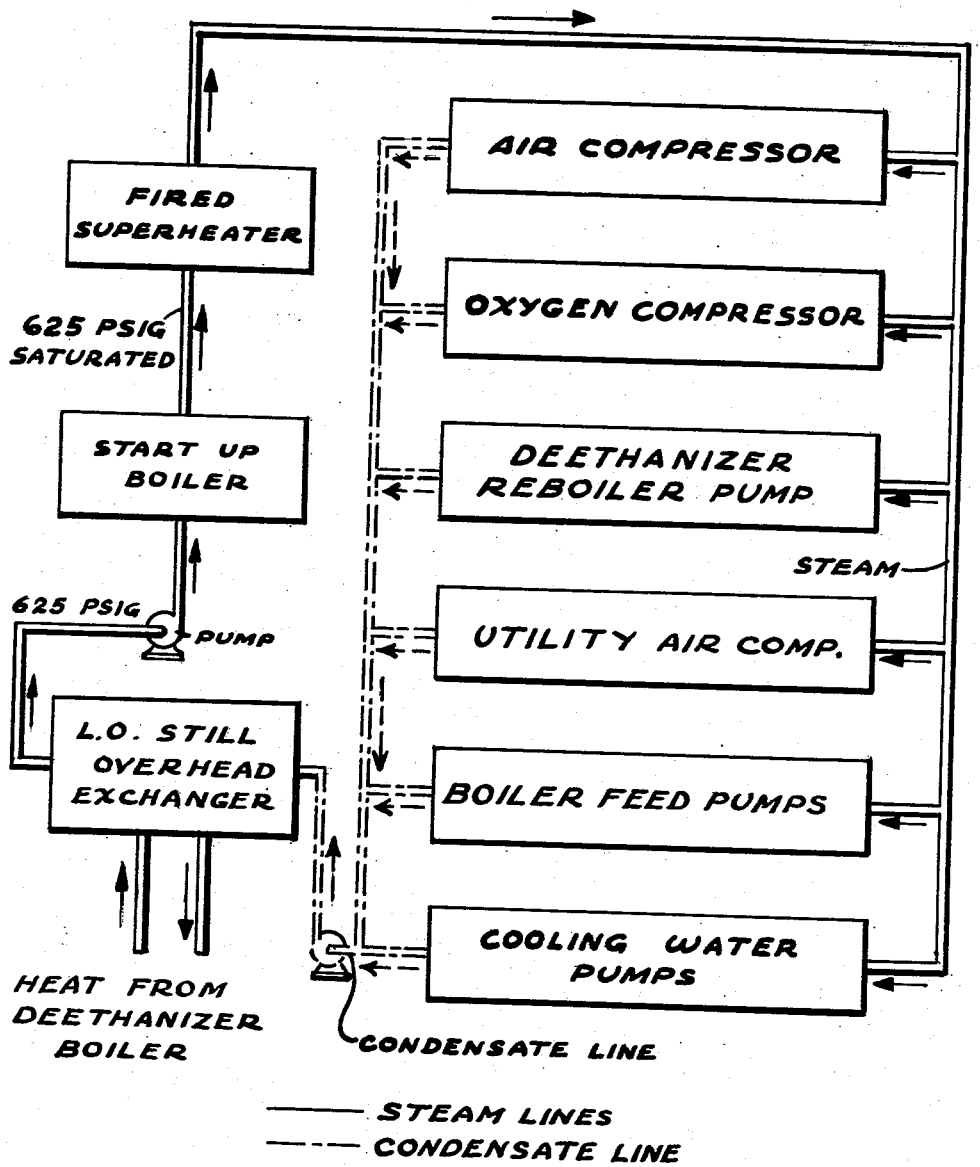

The invention will be fully understood from the following detailed description referring to the accompanying drawing wherein Figure 1 is a schematic flow plan of a complete plant for the production of synthetic fuels and chemicals on the basis of natural gas in accordance with the present invention;

Figures 2A, 2B and 2C are more detailed views of the gas generation, synthesis and product recovery sections, respectively, of the plant illustrated in Figure 1; and Figures 3 and 4 are flowsheets showing the flow of steam and condensate water through the system.

Referring now to Figure 1, natural gas as it is recovered from the well and preferably a natural gas of low nitrogen content may be passed substantially at well pressure from gas storage facilities A to a casinghead recovery system B wherein hydrocarbons having 3 or more carbon atoms are removed by conventional methods, such as absorption, compression, and/or cooling to produce casinghead gasoline and a dry gas. The hydrocarbon products removed from the gas in B may be fractionated in C into a $C_3$, a $C_4$, and a $C_5+$ fraction. The $C_3$ and a portion of the $C_4$ fraction may be stored together in U to be used as bottled gas or for similar purposes, while another portion of the $C_4$ fraction and the $C_5$ and higher molecular weight hydrocarbons may be passed on to be mixed with the gasoline products of the process at P.

The dry gas recovered from plant B may have a composition about as follows:

| | Volume, per cent |
|---|---|
| $N_2$ | 0.1–0.3 |
| $CO_2$ | 0.1–0.5 |
| $CH_4$ | 92–96 |
| $C_2H_6$ | 3–5 |
| $C_3H_8$ | 0.5–1.0 |
| $C_4H_{10}$ | <0.1 |

Natural gas of this type is combined with synthesis tail gas produced, as will appear more clearly hereinafter, and the gas mixture is supplied to a synthesis gas generation stage D. Technically pure oxygen of about 90–99% purity is produced in oxygen plant E by the air liquefaction technique. Synthesis gas generation in stage D takes place by incomplete combustion with the oxygen supplied to produce a mixture consisting for the most part of hydrogen and carbon monoxide having an $H_2/CO$ ratio of between 1—2, preferably of about 1.3–1.7.

The synthesis gas so produced is cooled by heat exchange with other process materials and supplied at about synthesis temperature and pressure to synthesis plant F which, in accordance with the preferred embodiment of the invention, is operated as a fluid catalyst type synthesis system using iron-type catalysts. The feed gas is preferably admixed with recycled tail gas prior to its admission to the synthesis reactor. Broad ranges of operating conditions for this type of hydrocarbon synthesis include temperatures of about 550°–800° F., pressures of about 150–650 lbs. per sq. in., total gas velocities of about 0.3–1.5 ft. per sec., at catalyst particle sizes of about 20–200 microns and apparent densities of about 50–150 lbs. per cu. ft. as well as total gas throughputs of about 10 to 1,000 V./Hr./W. (defined as the standard cu. ft. of total gas feed per hour per lb. of carbon- and oxygen-free catalyst in the reaction space). The volumetric ratio of recycle gas to fresh feed gas may be maintained within the approximate range of 0–6. Synthesis plant F also includes conventional means of separating the reactor effluent into normally gaseous constituents, an oil layer and an aqueous layer containing also oxygenated products.

The normally gaseous constituents and the oil layer are sent to absorption plant G after the amount of gas required for recycle has been split off the stream of gaseous constituents. In plant G the gaseous constituents are scrubbed with the product oil in a manner which will be explained in detail below with reference to Figure 2C. Essentially 3 separate streams leave absorption plant G. A gas stream comprising essentially hydrocarbons having 2 carbon atoms per molecule or less, nitrogen, hydrogen, carbon monoxide and carbon dioxide, is partly recycled to synthesis gas generation stage D as mentioned above and partly passed to fuel gas storage facilities H. A stream containing hydrocarbons having 3 or 4 carbon atoms per molecule is passed to a polymerization plant I wherein the olefinic hydrocarbons may be polymerized by conventional polymerization processes in the presence of polymerization agents such as sulfuric acid or phosphoric acid carried on suitable supports, such as kieselguhr or the like, to form hydrocarbons of the motor fuel boiling range. Gaseous hydrocarbons remaining unpolymerized may be combined with the gas stream leaving absorption plant G. Polymer product containing some $C_4$ hydrocarbons may be withdrawn from plant I to storage L to be eventually combined with other gasoline product in mixing plant P. Polymer bottoms boiling above the motor fuel range may be stored in M and/or combined with other products of similar boiling range in fuel oil facilities Q. A third stream containing hydrocarbons having 5 or more carbon atoms per molecule is passed from absorption plant G to a catalytic treating plant K wherein these materials may be refined by catalytic cracking, hydroforming, or similar refining operations. The products of such catalytic treatments are fractionated into a gas stream containing hydrocarbons of 4 or less carbon atoms per molecule which is reprocessed in the above-mentioned absorption plant G, motor fuel fractions containing $C_5$ and higher molecular hydrocarbons boiling up to about 400° F. which may be combined with the gasoline stock in P, and an oil having a boiling range above 400° F. which may be sent to fuel oil storage Q. Intermediate storage facilities M, N, and O may be provided for polymer bottoms, catalytically treated gasoline and catalytically treated fuel oil, respectively.

Returning now to synthesis plant F, the water layer recovered from the reactor effluent is passed to a recovery plant R for the separation of alcohols and acids from the water layer by conventional chemical and physical means.

Having thus described the general outline of the process of the present invention, its novel features and the objects and advantages accomplished thereby will be best understood from the following more detailed description of individual sections of the system illustrated in Figure 1, wherein reference will be made to Figures 2A, 2B, and 2C.

The system illustrated in Figures 2A, 2B and 2C will be described using the production of about 10,000 barrels of motor fuel and fuel oil from a dry natural gas of the type referred to above having about the following composition:

| | Volume, per cent |
|---|---|
| $N_2$ | 0.20 |
| $CO_2$ | 0.30 |
| $CH_4$ | 94.57 |
| $C_2H_6$ | 4.14 |
| $C_3H_8$ | 0.75 |
| $C_4H_{10}$ | 0.04 |

Referring now more specifically to Figure 2A, about 114 MM SCF/SD (million standard cu. ft. per stream day) of this dry natural gas are supplied at a temperature of about 60° F. through line 1 to line 5. Simultaneously about 46 MM SCF/SD of recycle gas obtained in the synthesis section of the system as will appear more clearly hereinafter are added through line 3 to line 5. The gas mixture is passed through line 5 at a temperature of about 70° F. and a pressure of about 495 lbs. per sq. in. to a heat exchanger 10 wherein its temperature is raised to about 920° F. in indirect heat exchange with synthesis gas produced in synthesis gas generator 25. For this purpose, heat exchanger 10 may have a capacity of about 172 million B. t. u. per hour and a heat exchange surface area of about 14,000 sq. ft. The preheated feed gas is passed through line 12 at a pressure of about 465 lbs. per sq. in. to burners 14 arranged in a lower portion of generator 25. The feed gas is mixed in burners 14 with about 81 MM SCF/SD of oxygen of 95% purity produced in oxygen plant 14 by air liquefaction and fractionation. The oxygen is compressed in a compression stage 15 comprising preferably 3 three-stage centrifugal oxygen compressors, to a pressure of about 483 lbs. per sq. in. and passed at a compressor outlet temperature of above 350° F., preferably about 430° F. (for an $O_2$ inlet temperature of about 100° F.) to heat exchanger 17 wherein the temperature of the oxygen is raised to about 800° F. in indirect heat exchange with synthesis gas produced in generator 25. The temperature differential between oxygen inlet and outlet temperatures of this compression stage should generally be about 200°–400° F. Heat exchanger 17 may have a capacity of about 24 million B. t. u. per hour and heat exchange surface of about 2,730 sq. ft. The preheated oxygen is supplied through line 20 to the generator burners 14 at a temperature of about 800° F. Oxygen heat exchanger 17 may be a low duty preheater of the type specified as a result of the relatively high outlet temperature of oxygen compressors 15 of at least 430° F., which, as has been found, may be readily maintained using centrifugal multistage oxygen compressors of conventional design.

Conditions which have been found particularly suitable for the operation of the compressor-intercoolers of a compressor plant 15 of otherwise conventional design are tabulated below.

*Oxygen compressor intercoolers*

[Temperatures, °F.]

| Fluid—Intercoolers | Oxygen | |
|---|---|---|
| | Inlet | Outlet |
| Between Compressor Stages 1+2 | -425 | 105 |
| Between Compressor Stages 2+3 | 431 | 105 |

Synthesis gas generator 25 consists of a lower combustion section 27 and an upper boiler section 29 formed by brick or refractory walls 30. A metal shell 31 is provided to permit operation at the elevated pressure specified. Boiler section 29 contains a bundle of preferably vertical boiler tubes 32 topped by a steam header 34 and closed at the bottom by a thermally insulated boiler tank 36. Boiler section 29 is shown in the drawing as having a diameter substantially smaller than combustion section 27. The purpose of this difference in diameters is a substantial increase of the gas velocity in the boiler section as compared to that in the heater section in order to take advantage of a corresponding increase in the heat transfer coefficient at the high pressures involved without interfering with the relatively low gas velocities which should be maintained in combustion section 27 as a function of the velocity of flame propagation. If desired, metal shell 31 may be surrounded by a cooling water jacket (not shown) particularly in the combustion section to protect the metal from excessive temperatures.

A generator of the type illustrated in the drawing may be operated at pressures of about 400–600 lbs. per sq. in., temperatures of about 2,000°–2500° F. in the combustion section, boiler section outlet gas temperatures of about 800°–1200° F. and gas velocities of about 8–12 ft. per sec. in the combustion section and about 100–200 ft. per sec. in the boiler section. Operating conditions preferred for the specific example here involved are listed in the following table.

*Synthesis gas generator*

Combustion section:
- Temperature, °F. _____ 2260
- Pressure, p. s. i. g. _____ 465
- I. D., ft. _____ 10.25
- Height, ft. _____ 27
- Outlet gas vel., ft./sec. _____ 9.5
- Reaction time, sec. _____ 2.8+

Boiler section:
- Temperatures, °F.:
  - Inlet _____ 2260
  - Outlet _____ 1000
- Pressure drop, p. s. i. _____ 4.6
- I. D., ft. _____ 3.0
- Height, ft. _____ 40.0
- Gas velocity, ft./sec.:
  - Inlet _____ 195
  - Outlet _____ 105
- Boiler area, ft.² _____ 5280
- Tube spacing, in. sq. _____ 1.375
- Tube O. D., in. _____ 1.0
- Heat flux, B. t. u./hr./ft.²:
  - Average _____ 89,000
  - Maximum _____ 156,000

These conditions may be maintained by supplying about 92,700 gals. of water per hour at about 470° F. and a pressure of about 625 lbs. per sq. in. through line 38 to steam drum 40 from which water is withdrawn through line 42 and supplied to boiler tank 36. A mixture of steam and condensate leaving boiler tubes 32 is returned through line 44 to steam drum 40. High pressure saturated steam may be withdrawn from steam drum 40 through line 46 at a rate of about 628,000 lbs. per hour. Use of high synthesis gas pressure in the combustion and boiler section of the generator results in much more efficient utilization of the boiler surface than is obtainable at relatively low pressures of, say, about atmospheric. For example, the heat transfer coefficient is substantially increased, affording an average heat flux of about 7.5 times as great as that obtained in atmospheric pressure operation. Methane conversion in combustion section 27 may be readily maintained at about 90–92%.

The synthesis gas produced is withdrawn through line 50 and passed at a temperature of about 1000° F. partly to heat exchanger 10 and partly to heat exchanger 17 wherein some of its heat is transferred to the hydrocarbon feed gas and the oxygen, respectively, as described above. The cooled synthesis gas is withdrawn from heat exchanger 17 at a temperature of about 630° F. and from heat exchanger 10 at a temperature of about 380° F., combined in line 52 to assume a temperature of about 425° F. and passed at a pressure of about 450 lbs. per sq. in. to a boiler feed preheater 54 wherein it is cooled in heat exchange with about 1,000,000 lbs. per hour of boiler feed water fed at a temperature of about 125° F. to assume a temperature of about 175° F. A heat exchanger having a capacity of about 154 million B. t. u. per hour and a heat exchange surface of about 13,000 sq. ft. is adequate for this purpose and to yield a boiler feed having a temperature of about 275° F. By cooling the synthesis gas in heat exchanger 54 down only to 175° F. rather than to the substantially lower temperatures which are conventional, the water content of the synthesis gas is increased from, say, about 0.22 to about 1.5%. However, some 20 million B. t. u. per hour of additional heat are made available for steam production in the synthesis section as a result of this higher synthesis gas temperature. Any potential detrimental effect of the increased water vapor content on the synthesis reaction may be overcome by a slight increase of the ratio of recycle gas to fresh feed gas supplied to the synthesis reactor. The cooled synthesis gas is supplied through line 56 at a pressure of about 450 lbs. per sq. in. to a separator 58 wherein condensed water is separated from the gas. About 72,000 lbs. per hour of condensed water are removed from separator 58. The synthesis gas now free of liquid water is passed through line 60 in an amount of about 370 MM SCF/SD to the synthesis section of the system which is illustrated in Figure 2B.

Referring now to Figure 2B, the synthesis gas in line 60 is admixed with about 560 MM SCF/SD of synthesis tail gas obtained by separation of normally liquid products from the synthesis reactor effluent as will appear more clearly hereinafter, and supplied through line 62. The gas mixture flows at a temperatuer of about 140° F. and a pressure of about 440 lbs. per sq. in. through line 64 to heat exchanger 65 wherein its temperature is raised to about 275° F. in heat exchange with the total effluent from synthesis reactor 70. A heat exchanger having a capacity of about 125 million B. t. u. per hour and a heat transfer area of about 22,000 sq. ft. is sufficient for this purpose. The gas mixture is then supplied through line 67 at a pressure of about 435 lbs. per sq. in. to synthesis reactors 70 in an amount of about 930 MM SCF/CD.

Synthesis reactors 70 may be of a design conventional for fluid operation and provided with a distributing grid 72 in its lower portion and gas-solids separating means such as cyclones 74 in its upper portion. Each reactor contains about 145 tons of an iron-type catalyst having an average particle size of about 32 microns. The dimensions of the reactor are such that an inlet gas velocity of about 1.4 ft. per sec. and a gas velocity of about 1.1 ft. per sec. at the top of the fluidized catalyst mass $m$ is maintained when the amount of synthesis gas flowing through line 67 is distributed over 6 reactors of the type of reactor 70, operated in parallel. For this purpose, the cylindrical section of each reactor may have an inner diameter of about 11 ft. and a height of about 55 ft. Each reactor is provided with a cooling coil 76 having a heat transfer area of about 3,000 sq. ft. A total of about 92,000 gals. of water of 470° F. is supplied to reactors 70 to maintain therein a temperature of about 650° F. and to produce a total of about 620,000 lbs. per hour of saturated steam at 625 lbs. per sq. in. pressure. Assuming reactor dimensions of the type specified above, this may be accomplished by conventional boiler tube arrangements.

The preferred iron catalyst for the process of this invention is a pyrites ash sintered at a temperature of about 1200°–1600° F., ground to a particle size of about 100 microns and reduced with hydrogen at 900° F. and 425 lbs. per sq. in. pressure to an oxygen content of about 5% calculated on iron. In the course of the synthesis reaction, the oxygen content of the catalyst increases, carbon is deposited and considerable catalyst disintegration takes place. It is desirable to maintain the oxygen content of the catalyst at about 20%, the carbon content at about 34%, based on iron, and the average particle size at about 32 microns. This may be accomplished by supplying a total of about 50,000 lbs. per day of freshly reduced sintered catalyst of 100 micron particle size through line 78 to reactors 70. The catalyst hold-up of reactors 70 may be maintained substantially constant by catalyst entrainment in the reactor effluent. If desired, catalyst fines separated in separator 74 may be withdrawn from the system through line 80.

Total reactor effluent is withdrawn from reactors 70 through line 82 at a temperature of about 650° F. and a pressure of about 400 lbs. per sq. in. and passed to a heat exchanger 85 wherein it is indirectly cooled to a temperature of about 470° F. by indirect heat exchange with the total boiler feed water of about 272° F. containing that withdrawn from heat exchanger 54 through line 55. About 1,250,000 lbs. per hour of boiler feed of 470° F. are recovered through line 87 from heat exchanger 85 which may have a capacity of 265 million B. t. u. per hour and a heat exchange surface area of about 18,430 sq. ft. The reactor effluent leaving heat exchanger 85 through line 89 is admixed with about 200 barrels per day of gas oil supplied through line 90 and the mixture is passed at a temperature of about 375° F. to heat exchanger 65 wherein part of its heat is given off to the synthesis feed gas as previously described. Reactor effluent now enters at a temperature of about 265° F. and a pressure of about 395 lbs. per sq. in. through line 92, a cooler 94 wherein it is cooled to a temperature of about 100° F. Cooler 94 may have a capacity of about 276 million B. t. u. per hour and a cooling area of about 29,000 sq. ft. Some 14,500 gals. per minute of water of 83° F. may be supplied to cooler 94 through line 96 and withdrawn through line 98 at a temperature of about 120° F.

A mixture of gaseous and liquefied reaction products is withdrawn from cooler 94 through line 100 at a temperature of about 100° F. and supplied at a pressure of about 390 lbs. per sq. in. to separator 102 in which a separation of the reaction products into a lower aqueous layer $a$, an upper oil layer $o$, and normally gaseous products takes place. The aqueous layer is withdrawn through line 104 to be further treated as will appear hereinafter. The oil layer is passed through line 106 to an absorption plant 110 wherein it is further separated into $C_2$ and lower boiling gases, $C_3+C_4$, and $C_5+$. A portion of the normally gaseous products passes from separator 102 through line 108 without a substantial pressure drop to plant 110 details of which are illustrated in Figure 2C. A portion of the oil layer, amounting to about 2.5 gals. per minute, may be continuously circulated from the bottom of the oil layer through line 112 and rotary filter 114 for the recovery of suspended catalyst fines. Other methods for handling the solids carried over may be employed, such as filtration of the liquid bottoms separated in the vaporizer handling the feed to the product treater, or separation and filtration of the condensate plus oil at the outlet of heat exchanger 65.

Of the 650 MM SCF/SD of tail gas separated in separator 102, about 560 MM SCF/SD are passed through line 116 to be recycled by recycle gas compressor 118 through lines 62, 64 and 67 to reactors 70. The gas in line 116 is under a pressure of about 385 lbs. per sq. in. Of the total tail gas obtained in absorption plant 110, about 75 MM SCF/SD are withdrawn through line 120 and about 11 MM SCF/SD through line 122 as will appear more clearly hereinafter. The gas in line 120 is under a pressure of about 370 lbs. per sq. in. and that in line 122 under a pressure of about 200 lbs. per sq. in. Some 35 MM SCF/SD of tail gas may be withdrawn from line 120 through line 121 and about 5 MM SCF/SD from line 122 through line 123 for fuel purposes. About 6 MM SCF/SD of tail gas from line 122 are combined with the gas in line 120 to make up a total of about 46 MM SCF/SD which may be compressed in recycle compressor 125 to about 495 lbs. per sq. in. pressure and returned through line 127 to lines 3 and 5 as the generator recycle stream referred to above. The gas in line 122 is particularly well suited for recycle to synthesis reactor 70 as a result of its high $CO_2$ content which may amount to about 70%, more or less. It may be desirable, therefore, to recycle all or a portion of the gas in line 122 through line 124 to reactor 70. Liquid products are withdrawn from adsorption plant 110 through line 130 and passed either to storage or to any further catalytic treatment of the type referred to above in connection with plants I and K of Figure 1.

One of the major differences of the design of the synthesis section illustrated in Figure 2B from conventional designs resides in the fact that no reactor overhead gas-oil scrubber and concomitant steam boiler is arranged on line 82. The purpose of this scrubber was to prevent fouling of the overhead coolers by the entrained catalyst at the point of primary condensation of the product. It has been found, however, that no condensation actually occurs until the reactor effluent gases are cooled to temperatures approaching 300° F. Therefore, advantage is taken in accordance with the present invention of the higher temperature level heat in heat exchanger 85 by introducing the 650° F. reactor effluent directly to this exchanger. A substantial reduction in exchanger area may be realized in this manner. Similarly, the temperature of the gas entering heat exchanger 65 is higher than in conventional cases. This factor, combined with the increased heat capacity of the gas stream resulting from the combination of fresh synthesis gas with recycle gas as the stream entering heat exchanger 65, allows a substantial increase in the heat load for exchanger 65 with little decrease in heat flux.

While condensation of oil and water products takes place in heat exchanger 65, fouling of the tubes of this exchanger is prevented by spraying a small amount of gas-oil through line 99 into the exchanger inlet as described above. This amount of oil is sufficient to give a solids concentration of less than 0.5 lb. per gal., based on an entrainment rate of .06 lb. per cu. ft. in the reactor effluent stream entering cyclones 74 operating at an efficiency of about 90% each. The slurry formed in heat exchanger 65 flows to separator 102 along with the synthesis products as described above.

Referring now to Figure 2C, absorption plant 110 is illustrated therein to comprise essentially an absorber 135, a deethanizer 140, a debutanizer 160, a lean oil still 190, and a stripper 220, which may be operated substantially as follows.

The product oil layer from section F of Figure 1 passes through line 106 (see also Figure 2B) into the stripper tower 220 where $C_5+$ hydrocarbons are removed at the bottom and passed through a pump to be combined with the debutanizer bottoms and sent to plant K of Figure 1 through line 130. Product gases from section F of Figure 1 pass through line 108 into the absorber 135 where $C_4+$ and most of the $C_3$ hydrocarbons are absorbed in oil. The rich oil leaving the absorber bottom is combined with the stripper overhead and sent to the deethanizer 140 where $C_2$ and lighter hydrocarbons pass overhead through line 120. Tail gas consisting of $C_2$ and lighter hydrocarbons separated in absorber 135 from the synthesis product gases from section F is also removed through line 122.

$C_3+$ products in absorber oil are withdrawn from the bottom of deethanizer 140 and enter the lean oil still 190 where open steam strips out $C_3+$ hydrocarbons and lean oil is withdrawn from the bottom to be cooled and reused in the absorber 135 and deethanizer 140. The $C_3+$ products leave the lean oil still 190 and are cooled by indirect heat exchange with boiler feed water followed by compression before entering the debutanizer 160. From the top of this column $C_3+C_4$ pass through line 170 to plant I of Figure 1.

$C_4$ and lighter hydrocarbons produced in plant K enter the deethanizer where the lean oil recovers $C_3$ and $C_4$ hydrocarbons. A fired reboiler 165 is used to provide heat to the deethanizer 140; alternate connections may be provided such that hot oil may be circulated directly from the fired reboiler 165 to the cooler 191 on the lean oil still overhead stream. This alternate circuit may be used for heating feed water during the start-up period.

The $C_5+$ hydrocarbon product withdrawn through line 130 may be catalytically treated in treating plant K. While bauxite treating may be used, a treatment with silica alumina cracking catalyst at about 950° F. is preferred. Fluid-type catalytic cracking systems of conventional design, including reactor and regenerator vessels may be used and operated at the conditions specified below.

*Treater vessels*

| Vessel | Reactor | Regenerator |
|---|---|---|
| Temperature ° F | 950 | 1,100 |
| Pressure p. s. i. g | 14.8 | 10 |

Because of the high olefin content of the fresh feed to the polymerization plant I, of about 86%, a relatively high recycle stream from the top of the polymer stabilizer is required to keep the concentration of olefins in the total feed to the polymerization reactors at the desired level. A total feed rate of about 11,900 barrels per day is adequate for this purpose. Because it is desired to recover all of the butanes for pressuring the gasoline in P of Figure 1 no debutanizer is required. Also, because the fresh feed to the polymer plant is relatively pure, no sulfur removal facilities are necessary.

The process steam produced in synthesis gas generator 25 and reactor 70 is sufficient to supply all of the integrated steam requirements of the process. All of the steam is produced at about 625 lbs. per sq. in. pressure and superheated to about 750° F. in a separate gas-fired furnace, while the 200 lbs. per sq. in. boiler normally included in the oil scrubber system has been eliminated together with the oil scrubber system. The flow of water and steam through the plant and the recovery of condensate are illustrated in Figure 3, which is largely self-explanatory. It may be sufficient to note with reference to Figure 3 that all steam is generated at 625 lbs. per sq. in. pressure while low pressure steam requirements are fulfilled using exhaust from steam engines. Condensate at atmospheric pressure is collected separately from vacuum condensate which comes from turbine condensers. Both condensate streams are combined and pumped through the preheaters to the boilers. It will be observed that in addition to air and oxygen compressor turbines, only the following drives require steam condensers:

Reactor recycle booster, 118
Propane refrigeration compressor
Utility air
Cooling water pumps These condensers utilize salt water at 83° F. and a maximum outlet water temperature of 104° F. All of the 200 lbs. per sq. in. and 125 lbs. per sq. in. saturated steam is provided by bleeding from air compressor turbines as shown in Figure 3. With the exception of the turbines noted which have steam condensers, the remainder of the turbines discharge to the 15 lbs. per sq. in. steam main. About 28,000 lbs. per hour of the superheated high pressure steam is throttled to 200 lbs. per sq. in. for process stripping purposes in lean oil still 190.

No continuously operating fired boiler is required in the design illustrated by the drawings in contrast to conventional designs because a fired reboiler 150 is used on the bottoms of deethanizer 140 in absorption plant 110. This arrangement reduces the total steam requirement of absorption plant 110 by as much as 100,000 lbs. per hour as compared to prior art designs. In addition, the elimination of the 200 lbs. per sq. in. steam boiler after synthesis reactor 70 has made it possible to utilize that heat in preheating boiler feed water for the production of 625 lbs. per sq. in. steam. Greater efficiency is thus realized by supplying any 200 lbs. per sq. in. steam required by bleeding the high pressure steam through oxygen plant air compressor turbines. Since no continuously operated fired boiler is required, a relatively cheap steam boiler may be provided for temporary starting-up purposes.

Such a furnace may also be designed for a disposal of the product water layer when the chemical recovery sections are shut down. The boiler may be so designed as to produce enough steam to supply one complete section of the oxygen plant and one oxygen compressor and thus provide a means for starting the synthesis gas generator and boiler at full operating pressure. This arrangement makes it possible to design gas generator 25 for operation at high pressures only.

Since all of the steam for normal plant operation is provided by the reactor and generator waste heat boilers, it is necessary in starting up to generate sufficient steam to get one oxygen plant unit into operation and thereby initiate waste heat steam production in the synthesis plant. The oxygen from this unit may be compressed to full generator pressure in order to obtain high heat transfer rates in the generator boiler. For this purpose, it is desirable to provide a special low cost start-up boiler burning natural gas and producing about 185,000 lbs. per hour of saturated steam. In starting up, boiler feed water may be preheated in absorption plant 110 by circulating oil at about 500° F. from fired reboiler 165 through overhead boiler feed preheater 191 of lean oil still 190. The saturated steam may be superheated to 750° F. in the fired superheater (Figure 3), which is provided for normal plant operation. The start-up boiler hook-up is shown in Figure 4 in a manner similar to the flow of Figure 3.

The total oxygen supply may be generated in 3 plant units, each with a separate air compressor and oxygen compressor. The 185,000 lbs. per hour of steam mentioned above is sufficient to start one oxygen unit to full capacity and operate all the necessary auxiliaries. This constitutes the first increment of starting-up and may be provided in order to put one oxygen unit in operation as rapidly as possible.

The next step is to make steam available for oxygen compression by reducing the flow of steam to the air compressor turbine, such that only 55% of the rated compressed air is available to the oxygen plant unit. Under these conditions, the plant will produce about 50% of its designed oxygen output. The steam requirement for air compression may then amount to about 107,000 lbs. per hour. Thus by backing off on the steam supply to the air compressors, it is possible to provide about 54,000 lbs. per hour of steam for oxygen compression. This is sufficient to operate one oxygen compressor at 50% of its rated capacity. Consequently, it is possible to provide, at high pressure, one-sixth of the total oxygen capacity using the steam made available as described above. Synthesis gas generation is now initiated and saturated steam from the generator waste heat boiler becomes available. Thereafter, sufficient steam is being produced to start one of the synthesis reactors.

The plant may then be brought up to full operation by steps in which steam as it becomes available from waste heat boilers is used to start additional oxygen plant units. Synthesis gas generation may be increased at increments of one-sixth total capacity and may be sent at 650° F. to one of the 6 synthesis reactors 70 wherein additional steam is generated by the synthesis reaction. The steam supply outlined above has been found to be more than adequate after waste heat steam has once become available from the generator and reactor.

As previously indicated, the aqueous layer removed through line 104 may be worked up by chemical and physical means to recover alcohols, acids, and other water-soluble synthetic chemicals. When none of the other soluble chemicals are worth recovering except for such alcohols as may be blended into gasoline, a water-alcohol mixture may be distilled off the acid product water whereafter treated synthetic gasoline, including polymerization product, may be used to extractively distill the alcohols. The acid water may be disposed of by preheating with excess steam followed by combustion with excess tail gas from absorption plant 110. In this case, boiler feed water make-up requirements may be supplied by water condensed from synthesis gas and withdrawn from separator 58 augmented by about 40 gals. per minute from evaporators of acid water.

When alcohols are merely dehydrated for blending into gasoline and water-soluble acids are recovered, a considerable reduction may be effected in the steam requirements for chemical recovery compared with the case where both alcohols and acids are recovered in the form of pure chemicals.

At the conditions specified for the above examples, about 160,000 lbs. per hour of water may become available as extractive product water layer leaving the acid recovery plant and containing about 0.03% of acetic acid. Upon neutralization, this stream may be used to make up for the total plant condensate losses which may amount to about 156,000 lbs. per hour. Any deficiency which may arise from additional losses incurred through boiler blow-down to maintain solids concentration below about 0.25% may be made up by utilizing water condensed from the synthesis gas and removed from separator 58. While some carbon may appear in this water, a substantial proportion will be available in a carbon-free form because the synthesis gas is cooled in exchanger 54 which may have several series stages of exchangers, so that most of the carbon may be eliminated by separating water between these stages, and relatively pure water is condensed in the last stage.

About 40 MM SCF/SD of oil-scrubbed synthesis tail gas will be available for fuel purposes from the system described above in addition to the gas recycled to the generator. This tail gas consists of overhead streams from the absorber and deethanizer of absorption plant 110. It includes all gas produced in the process lighter than propylene and in addition quantities of propylene and propane equivalent to about 20% of the $C_3$ hydrocarbons produced in the synthesis. This gas may have an analysis as follows:

| Constituent: | Volume, percent |
|---|---|
| $H_2$ | 18.6 |
| CO | 3.1 |
| $CO_2$ | 43.3 |
| $N_2$ | 10.8 |
| $CH_4$ | 19.1 |
| $C_2H_4$ | 2.3 |
| $C_2H_6$ | 1.5 |
| $C_3H_6$ | 0.7 |
| $C_3H_8$ | 0.6 |
| | 100.0 |

The total heating value of this gas is about 590 million B. t. u. per hour. The following tabulation summarizes the heat and fuel requirements of the system illustrated in the drawing.

| Unit | Heat Output, MM B. t. u./Hr. | Fuel Gas Input, MM B. t. u./Hr. | Percent of Tail Gas |
|---|---|---|---|
| Steam Superheater | 222 | 288 | 48.7 |
| Absorption Plant | 132 | 171 | 28.9 |
| Treating Plant | 18 | 35 | 5.9 |

It will be seen that there is excess tail gas available equivalent to almost 100 MM B. t. u. per hour.

In order to illustrate the production efficiency of the system illustrated by the drawing, the selectivity of carbon in the CO converted to liquid products is tabulated below.

| Product constituent: | Barrels per day |
|---|---|
| $C_3$ hydrocarbons | 1772 |
| $C_4$ hydrocarbons | 1860 |
| $C_5$-400° F. hydrocarbons | 7250 |
| 400° F.+ hydrocarbons | 2210 |
| Oxy comp. (in $H_2O$) | 1820 [1] |

[1] As ethanol equivalent of carbon in water layer.

A treatment of the 9,460 B/D of $C_5+$ hydrocarbon product in catalytic treating plant K as described above will yield the following normally liquid or readily liquefiable products:

| Product constituent: | Barrels per day |
|---|---|
| $C_3$ hydrocarbons | 490 |
| $C_4$ hydrocarbons | 600 |
| $C_5$-400° F. hydrocarbons | 6400 |
| 400° F.+ hydrocarbons | 1420 |
| | 8910 |

The Reid vapor pressure of the treated $C_5$-400° F. product is about 6.2 lbs. per sq. in. and its research octane numbers are about 94.7 clear and 98.9 with 2 c. c./gal. of tetraethyl lead.

The $C_3$ and $C_4$ constituents of the synthesis product polymerized in plant I as described above are as follows:

| Constituent: | B/SD |
|---|---|
| $C_3H_6$ | 1630 |
| $C_3H_8$ | 281 |
| $C_4H_8$ | 2136 |
| $C_4H_{10}$ | 335 |
| | 4382 |

Plant I converts about 95% of the olefins to polymer gasoline and about 5% to polymer bottoms. The resulting yields and product quality of this polymerization are tabulated below:

| | B/SD | RVP | Research O. N. Cl | Research O. N. +2 cc. |
|---|---|---|---|---|
| Polymer | 2,625 | 2.5 | 97.4 | 100.3 |
| Bottoms | 138 | | | |
| $C_3H_6$ | 82 | | | |
| $C_3H_8$ | 281 | | | |
| $C_4H_8$ | 107 | | | |
| $C_4H_{10}$ | 335 | | | |

Because there is no debutanizer included in the polymerization plant, the above $C_4$'s are actually recovered in combination with the polymer. The $C_3$'s are separated in the stabilizer, which provides recycle gas for the polymerization reactors, and the net quantities (of $C_3$'s) indicated above are discarded as part of the synthesis plant tail gas.

In addition to these products, substantial amounts of gasoline hydrocarbons may be recovered from the natural gas in casinghead recovery plant B of Figure 1 about as follows:

| Constituent: | B/SD |
|---|---|
| $C_3$ | 696 |
| $iC_4$ | 221 |
| $nC_4$ | 411 |
| $C_5+$ | 591 |
| | 1919 |

The $C_5$-400 product from the treating plant may be blended with the polymer and with the $C_5+$ from the casinghead plant to form the gasoline base stock. The polymer stream in this blend includes the unconverted butylenes and the normal butane from the polymerization plant. The gasoline then may be brought up to a Reid vapor pressure of 10 p. s. i. by the addition of the required amount of $C_4$'s recovered in the casinghead plant. The octane number of the resulting gasoline may be raised to 97 research by the addition of tetraethyl lead. The following tabulation summarizes the yields of all products.

Products, B/SD:
  Gasoline, 10 lb. RVP _____ 10,457
    O. N. Res. Cl _____ 95.7
    TEL for 97 O. N., cc./gal _____ 0.34
  Gas oil _____ 1,558
  Alcohols, recovered _____ 913
  Acids, recovered (M lb./SD) _____ 562 (203.6)
  LPG [1] _____ 929

[1] Includes excess $C_4$'s and all $C_3$'s from casinghead recovery plant.

An increase in gasoline yield of 15% over conventional procedure has been realized and appreciable increases in the other products have also been obtained. The synthetic products in the above gasoline amounts to 90.5%. If recovered casinghead is not blended with the synthetic products in the gasoline, extraneous $nC_4$ amounting to 481 B/SD will be required to pressure the gasoline. The resulting gasoline yield, having a research octane number of 96.5, is 9948 B/SD. The process of the invention also has been found to afford a yearly return on total investment about 40-45% greater than that of previous designs.

What is claimed is:
1. The process for producing valuable synthetic products from a normally gaseous hydrocarbon which comprises subjecting said hydrocarbon in a synthesis gas generation zone to partial thermal combustion with free oxygen at a temperature of about 2000° to 2500° F., operating exclusively at a pressure of above about 400 p. s. i. g. to produce a gas mixture containing $H_2$, CO and water vapor, cooling said gas mixture in indirect heat exchange with $H_2O$, said hydrocarbons, and said oxygen substantially at said pressure to a temperature not substantially below 175° F. and removing as liquid water the $H_2O$ condensed therefrom at said temperature, reheating said gas mixture to a temperature of 250° to about 300° F., contacting said reheated gas mixture with a dense turbulent mass of a subdivided fluidized iron-type catalyst in a synthesis zone substantially at said pressure, indirectly cooling said catalyst with water to maintain a synthesis temperature of about 600 to 700° F., withdrawing a gasiform effluent from said synthesis zone at substantially said synthesis temperature and pressure, cooling said effluent exclusively in indirect heat exchange with water to a temperature within the range of about 350° to 470° F. at which substantially no liquid condensation takes place, further cooling said effluent by adding thereto a minor amount of a heavy oil boiling above said latter temperature, passing the resulting mixture of liquid and vapors in indirect heat exchange with said gas mixture of not below about 175° F. to reheat said mixture to about 250–300° F., and finally condensing normally liquid products from said effluent.

2. The process according to claim 1 in which all the gas streams compressed for feeding into said synthesis gas generation zone and said synthesis zone, including hydrocarbon, free oxygen and recycle gas streams, are at substantially room temperature when fed to compression.

3. The process of claim 1 in which steam required to maintain the process in operation is generated exclusively by indirect heat exchange with the effluent gas from said generation zone and with the fluidized catalyst in said synthesis zone at a high pressure, low pressure steam requirements being supplied as exhaust steam from stages using high pressure steam.

4. The process of claim 1 in which said cooling of said gas mixture from said synthesis gas generation zone to a temperature not below 175° F. is carried out in stages, water condensed in successive stages is removed, and water recovered from the last stage is used to produce steam required for the process.

References Cited in the file of this patent

UNITED STATES PATENTS

| Number | Name | Date |
|---|---|---|
| 2,253,607 | Boyd et al. | Aug. 26, 1941 |
| 2,264,427 | Asbury | Dec. 2, 1941 |
| 2,274,064 | Howard et al. | Feb. 24, 1942 |
| 2,324,172 | Parkhurst | July 13, 1943 |
| 2,360,463 | Arveson | Oct. 17, 1944 |
| 2,400,075 | Claussen | May 14, 1946 |
| 2,436,957 | Eastman | Mar. 2, 1948 |
| 2,461,065 | Kemp, Jr. | Feb. 8, 1949 |
| 2,464,532 | Sellers | Mar. 15, 1949 |
| 2,470,216 | Keith | May 17, 1949 |
| 2,472,219 | Lyons | June 17, 1949 |
| 2,476,788 | White | July 19, 1949 |
| 2,527,846 | Phinney et al. | Oct. 31, 1950 |
| 2,533,666 | Gunness | Dec. 12, 1950 |